United States Patent
Palin et al.

(10) Patent No.: US 7,620,111 B2
(45) Date of Patent: Nov. 17, 2009

(54) SYMBOL INTERLEAVING

(75) Inventors: Arto Palin, Viiala (FI); Jukka Henriksson, Espoo (FI)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 10/522,689

(22) PCT Filed: Aug. 13, 2002

(86) PCT No.: PCT/FI02/00667
§ 371 (c)(1),
(2), (4) Date: Jan. 28, 2005

(87) PCT Pub. No.: WO2004/015948
PCT Pub. Date: Feb. 19, 2004

(65) Prior Publication Data
US 2006/0062314 A1   Mar. 23, 2006

(51) Int. Cl.
H04K 1/10   (2006.01)
H04L 27/28   (2006.01)

(52) U.S. Cl. .................. 375/260; 375/324

(58) Field of Classification Search .......... 375/324, 375/316, 295, 259–260, 267, 299; 711/756
See application file for complete search history.

(56) References Cited

U.S. PATENT DOCUMENTS

| 5,307,376 A | 4/1994 | Castelain et al. |
| 5,657,313 A | 8/1997 | Takahashi et al. |
| 5,732,068 A | 3/1998 | Takahashi et al. |
| 5,799,033 A | 8/1998 | Baggen |
| 6,151,296 A | 11/2000 | Vijayan et al. |
| 6,256,357 B1 | 7/2001 | Oshima |

(Continued)

FOREIGN PATENT DOCUMENTS

EP   1 124 344 A1   8/2001

(Continued)

OTHER PUBLICATIONS

ETSI EN 300 744 V1.4.1 (Jan. 2001).*

(Continued)

*Primary Examiner*—Shuwang Liu
*Assistant Examiner*—James M Perez
(74) *Attorney, Agent, or Firm*—Locke Lord Bissell & Liddell

(57) ABSTRACT

The invention relates to a method for communicating digital data using an orthogonal frequency division multiplexing (OFDM) transmission system (10) including at least one transmitter (600, 601) and receivers (700, 701). The method comprises selecting a mode of operation in a transmitter among at least one mode, each mode of operation being associated with a number of active carriers for payload data transmission, selecting a symbol interleaver in the transmitter from a set of symbol interleavers for symbol interleaving in said selected mode of operation, applying symbol interleaving in the transmitter on blocks of data units, mapping the interleaved data units onto the active carriers of said selected mode of operation, receiving the interleaved data units in the receiver, recognizing in the receiver the symbol interleaver used in the data transmission, selecting a de-interleaver in the receiver to correspond to the recognized symbol interleaver, and de-interleaving in the receiver the received data units using the selected de-interleaver.

30 Claims, 7 Drawing Sheets

U.S. PATENT DOCUMENTS

| | | | |
|---|---|---|---|
| 6,288,631 | B1 | 9/2001 | Shinozaki et al. |
| 6,950,474 | B1 * | 9/2005 | Sudo .......................... 375/260 |
| 2001/0033623 | A1 * | 10/2001 | Hosur ........................ 375/267 |
| 2002/1004461 | * | 4/2002 | Sipola ........................ 375/295 |
| 2002/0080887 | A1 * | 6/2002 | Jeong et al. ................. 375/295 |
| 2003/0200497 | A1 | 10/2003 | Starr |
| 2006/0193268 | A1 * | 8/2006 | Walton et al. ............... 370/264 |

FOREIGN PATENT DOCUMENTS

| | | | |
|---|---|---|---|
| JP | 2000013356 | | 1/2000 |
| JP | 2001060934 A | * | 3/2001 |
| JP | 2002218337 | | 8/2002 |
| RU | 2108667 C1 | | 4/1998 |
| RU | 2186460 C1 | | 7/2002 |
| WO | WO98/32256 | | 7/1998 |
| WO | WO00/60751 | | 10/2000 |
| WO | WO00/70771 | | 11/2000 |

OTHER PUBLICATIONS

Laszlo Horvath, et al., "A Novel, High-Speed, Reconfigurable. Demapper—Symbol •Deinterleaver Architecture for DVB-T", 1999 IEEE, pp. IV-382 through IV-385.

"Digital Video Broadcasting (DVB); Framing structure, channel coding and modulation for digital terrestrial television", ETSI EN 300 744, V1.4.1 (Jan. 2001), cover page and pp. 2-49.

Lis Grete Moller, "Digital terrestrial television, The 8k system", EBU Technical Review, Winter 1995, pp. 40- 50.

PCT International Search Report (as published), International Application No. PCT/FI2002/000667, Date of Completion of Search-Mar. 14, 2003.

* cited by examiner

SYMBOL INTERLEAVING

FIELD OF THE INVENTION

The invention relates to interleaving and de-interleaving. Especially, the invention relates to symbol interleaving and symbol de-interleaving in an orthogonal frequency division multiplexing (OFDM) based system.

BACKGROUND OF THE INVENTION

Coded orthogonal frequency division multiplexing (COFDM) modulation is used in broadcasting (or multicasting or unicasting) broadband digital signals from a transmitter to a plurality of receivers. As one example, DVB-T (Digital Video Broadcasting-Terrestrial) system as defined in the standard ETSI (the European Telecommunications Standards Institute) EN 300 744 (Version 1.4.1) is a system in which coded orthogonal frequency division multiplexing (COFDM) modulation method is used in broadcasting (or multicasting) broadband digital television signals from a DVB-T transmitter to a plurality of DVB-T receivers.

Generally, in digital data communication orthogonal frequency division multiplexing (OFDM) is used, the COFDM only being one example thereof.

As the standard explains, before digital data (e.g. MPEG-2 (Moving Picture Experts Group) coded video, audio and/or data stream) is ready for transmission a plurality of operations are applied to it by the DVB-T transmitter. These operations comprise, among other things, outer coding by Reed-Solomon encoder, outer interleaving (i.e. convolutional interleaving), inner coding (with the aid of punctured convolutional code) and inner interleaving.

The inner interleaving is performed in an inner interleaver which comprises a set of bit interleavers for bit-wise interleaving followed by a symbol interleaver for symbol interleaving. The purpose of inner interleaving is to improve the system's tolerance to errors and interference by reordering the digital data to be transmitted in such a way that, basically, information contained in successive/adjacent digital data sequences will not end up to be transmitted by adjacent carriers. In that way interference occurring only occasionally in the frequency of only one or only a few data carriers can be coped with efficient error correction that the system provides.

In DVB-T system the transmitted signal is organized in frames. Each frame has a duration and consists of 68 OFDM-symbols. Each OFDM-symbol, in turn, is constituted by a set of carriers. The standard describes the usage of two modes of operation: a "2K mode" and an "8K mode. In 2K mode the number of carriers is 1705 and in 8K mode the number of carriers is 6817. However, only 1512 carriers of the total 1705 carriers in 2K mode and 6048 carriers of the total 6817 carriers in the 8K mode are defined as "active" carriers which actually carry the digital data (i.e. payload, useful data). The rest of the carriers are mostly for control purposes. It should be noted that by using another method of counting which takes a particular guard band into account the total number of carriers of 2048 (2K mode) or 8192 (8K mode) may be obtained. These numbers correspond to the used FFT (IFFT) size in each case (FFT=Fast Fourier Transform, IFFT=Inverse FFT). However, the number of active carriers is still 1512 (2K mode) or 6048 (8K mode).

Mapping of digital data (data words, also referred to as bit words or data units) onto the active carriers is performed in the inner interleaver. More particularly, this task is done by the symbol interleaver. A separate "2K symbol interleaver" has been defined for 2K mode and an "8K symbol interleaver" for 8K mode. In 2K mode, the 2K symbol interleaver maps 1512 data words (that is 12 groups of 126 data words, wherein the length v of each data word is v=2, 4 or 6 bits depending on the used modulation method)) coming from the set of bit-interleavers onto the 1512 active carriers of one 2K mode OFDM-symbol. Similarly, in 8K mode, the 8K symbol interleaver maps 6048 data words (48 groups of 126 data words) onto the 6048 active carriers of one 8K mode OFDM-symbol.

Recently, DVB-T system has been evaluated for situations for which it was not originally designed, such as mobile reception. Also, new usage scenarios of the system, such as IPDC (IP—Data Casting (Internet Protocol)) have different new requirements for the system. The use of the existing DVB-T 8K mode would probably offer wide enough coverage for mobile reception. However, the achieved mobility with the 8K mode might be too slow, i.e. reception might not succeed e.g. in a vehicle driving fast like at the speed of 120 km/h. The 2K mode, on the other hand, would offer sufficient mobility. However, a high density of base stations would be required with the 2K mode because the so called guard interval length is not long enough to support long transmitter distances in that mode. One proposed compromising solution to this problem is to define a new mode: a "4K mode".

As to the inner interleaving of the proposed 4K mode, especially to the symbol interleaver, an obvious solution would be to define a new "4K symbol interleaver" which would map 3024 data words (24 groups of 126 data words) onto the 3024 active carriers of one 4K mode OFDM-symbol (it is probable that the number of active carriers would be 3024 in the 4K mode). However, this solution, of course, requires more space in the DVB-T transmitter and, particularly, in the plurality of DVB-T receivers since the new 4K symbol interleaver (or de-interleaver) has to be implemented in each device.

To overcome the above drawbacks there is need for a new method and system for communicating digital data and also need for new types of transmitters and receivers for implementation of the new method and system.

SUMMARY OF THE INVENTION

According to a first aspect of the invention there is provided a method for communicating digital data using an orthogonal frequency division multiplexing (OFDM) transmission system including at least one transmitter and receivers, the method comprising the steps of:
  selecting a mode of operation in a transmitter among at least one mode, each mode of operation being associated with a number of active carriers for payload data transmission;
  selecting a symbol interleaver in the transmitter from a set of symbol interleavers for symbol interleaving in said selected mode of operation;
  applying symbol interleaving in the transmitter on blocks of data units;
  mapping the interleaved data units onto the active carriers of said selected mode of operation;
  receiving the interleaved data units in the receiver;
  recognizing in the receiver the symbol interleaver used in the data transmission;
  selecting a de-interleaver in the receiver to correspond to the recognized symbol interleaver, and
  de-interleaving in the receiver the received data units using the selected de-interleaver.

Since the invention enables selecting the mode of operation and symbol interleaver differently from each other, it is possible to provide different depths of interleaving depending on different requirements put onto the system. Previously this was not possible since a fixed particular symbol interleaver was always used with a particular mode of operation.

According to a second aspect of the invention there is provided a transmitter for communicating digital data using an orthogonal frequency division multiplexing (OFDM) transmission system, the system having a set of modes of operation, said set comprising at least one mode of operation, each mode being associated with a predetermined number of active carriers used for transmitting payload data from the transmitter to a receiver, the transmitter comprising:

a set of symbol interleavers for symbol interleaving,
means for selecting a mode of operation for data transmission and
means for selecting a symbol interleaver from the set of symbol interleavers for symbol interleaving in said selected mode of operation.

According to a third aspect of the invention there is provided a receiver for communicating digital data using an orthogonal frequency division multiplexing (OFDM) transmission system, the system having a set of modes of operation, said set comprising at least one mode of operation, each mode being associated with a predetermined number of active carriers used for transmitting data units from a transmitter to the receiver, the system further having a set of symbol interleavers to be used for symbol interleaving at the transmitter, the receiver comprising:

means for receiving interleaved data units;
means for recognizing the symbol interleaver used in the data transmission;
a set of symbol de-interleavers for de-interleaving received data units which have been interleaved at the transmitter in the symbol interleaver and
means for selecting a symbol de-interleaver from the set of symbol de-interleavers corresponding to the recognized symbol interleaver.

According to a fourth aspect of the invention there is provided a digital data communicating system using an orthogonal frequency division multiplexing (OFDM) transmitting system comprising at least one transmitter and a plurality of receivers, the system having a set of modes of operation, said set comprising at least one mode of operation, each mode being associated with a predetermined number of active carriers used for transmitting payload data from a transmitter to at least one receiver, the transmitter having a set of symbol interleavers to be used for symbol interleaving on blocks of data units at the transmitter, the at least one receiver having a set of symbol de-interleavers for de-interleaving the interleaved data units at the receiver, the system further comprising:

means in the transmitter for selecting a mode of operation to be used in data transmission;
means in the transmitter for selecting a symbol interleaver for symbol interleaving in selected mode of operation;
means in the transmitter for applying symbol interleaving on blocks of data units;
means in said at least one receiver for receiving transmitted interleaved data units;
means in said at least one receiver for recognizing the symbol interleaver used in the data transmission;
means in said at least one receiver for selecting a symbol de-interleaver from a set of symbol de-interleavers corresponding to the recognized symbol interleaver.

According to a fifth aspect of the invention there is provided a symbol interleaver for applying block based symbol interleaving on data units, such as data words, for mapping said data units onto active carriers of a particular mode of operation of an OFDM based system, wherein the number of data units to be interleaved at a time is determined by a block size, wherein:

the symbol interleaver is arranged to use a block size different from the number of active carriers in said particular mode.

Dependent claims contain preferable embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawings in which.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 8:
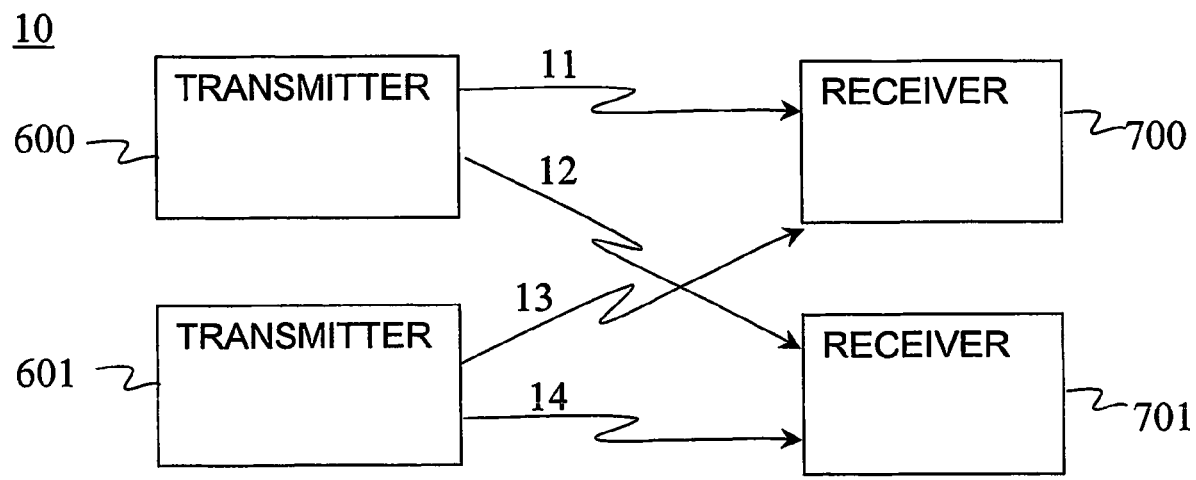
FIG. 8 shows a system in an embodiment of the invention for communicating digital data.

Referring first to FIG. 8, a system 10 for communicating digital data is shown for transmitting digital data to one or more receivers 600, 601 from one or more transmitters 700, 701 via multiple air interface paths 11, 12, 13, 14. The system 10 is, in accordance with an embodiment of the present invention, an orthogonal frequency multiplexing (OFDM) system.

Figure 1:
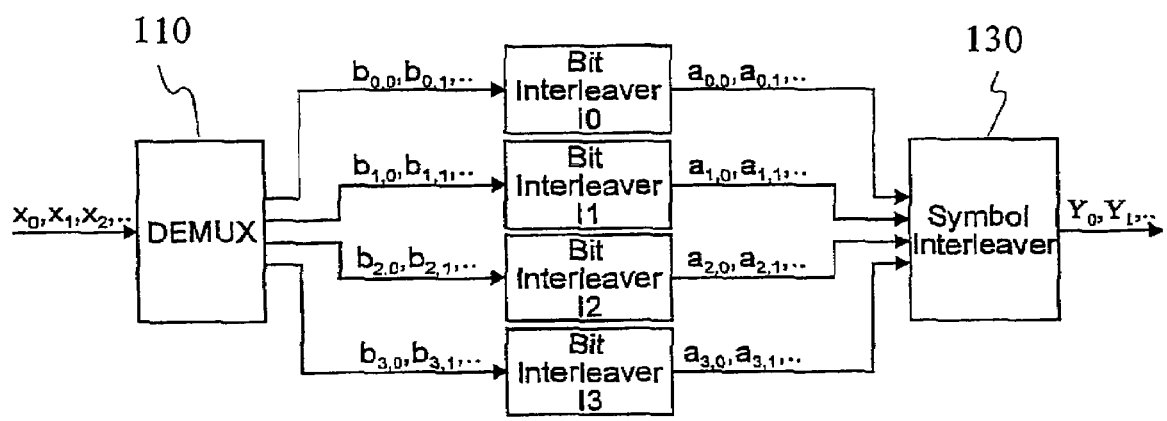
FIG. 1 shows an inner interleaver according to the DVB-T standard.

FIG. 1 shows an inner interleaver 100 as defined in the DVB-T standard ETSI EN 300 744 (Version 1.4.1). FIG. 1 is applicable also for the description of the invention. The inner interleaver can be implemented either by hardware or software or their combination. A hardware implementation on suitable semiconductor components is preferable. An input stream $x_0, x_1, x_2, \ldots$ is demultiplexed in a demultiplexer 110 into v sub-streams, wherein v is the number of bits per one modulation symbol. In the exemplary case of FIG. 1, the used modulation method is 16-QAM (Quadrature Amplitude Modulation) in which the number of bits per one modulation symbol is 4 (v=4).

Bit interleaving (and the subsequent symbol interleaving) is block based and is performed only on the useful data (payload). Each sub-stream from the demultiplexer 110 is processed by a separate bit interleaver with the aid of an interleaving sequence which has been defined separately for each bit interleaver. The sub-stream $b_{0,0}, b_{0,1}, \ldots$ is conveyed to a first bit interleaver I0. The sub-stream $b_{1,0}, b_{1,1}, \ldots$ is conveyed to a second bit interleaver I1. The sub-stream $b_{2,0}, b_{2,1}, \ldots$ is conveyed to a third bit interleaver I2, and the sub-stream $b_{3,0}, b_{3,1}, \ldots$ is conveyed to a fourth bit interleaver I3. The used block size in bit-interleaving is 126 bits. Therefore, each of the sub-streams $b_{0,0}, b_{0,1}, \ldots, b_{1,0}, b_{1,1}, \ldots, b_{2,0}, b_{2,1}, \ldots$ and $b_{3,0}, b_{3,1}, \ldots$ consists of 126 bits.

The first bit interleaver I0 produces an output bit stream $a_{0,0}, a_{0,1}, \ldots$. The second bit interleaver I1 produces an output bit stream $a_{1,0}, a_{1,1}, \ldots$. The third bit interleaver I2 produces an output bit stream $a_{2,0}, a_{2,1}, \ldots$ and the fourth bit interleaver I3 produces an output bit stream $a_{3,0}, a_{3,1}, \ldots$. Each of the output bit streams $a_{0,0}, a_{1,0}, a_{1,1}, \ldots, a_{2,0}, a_{2,1}, \ldots$ and $a_{3,0}, a_{3,1}, \ldots$ consists of 126 bits.

The output bit streams of the v bit interleavers (in this exemplary case v=4) are conveyed to a symbol interleaver 130. The output bit streams are grouped in order to form data words, so that each data word of v bits (v=4) will have one bit from each of the bit-interleavers. In this way, 126 data words each consisting of v bits are formed. The symbol interleaver 130 interleaves these data words. It is to be noted that in the symbol interleaver the bits of the data words are not interleaved but the whole data words are. In the 2K mode, as defined in the standard, 12 groups of 126 data words (12*126=1512) are interleaved for the purpose of mapping them onto the 1512 active carriers of one 2K mode OFDM-symbol. Accordingly, the block size of 2K symbol interleaver is 1512 data words. Similarly, in the 8K mode, 48 groups of 126 data words (48*126=6048) are interleaved for the purpose of mapping them onto the 6048 active carriers of one 8K mode OFDM-symbol. Accordingly, the block size of 8K symbol interleaver is 6048 data words. Depending on the implementation, the symbol interleavers of different modes (2K mode, 8K mode) may be implemented as separate symbol interleaver components or they may be integrated into a single 'combined' symbol interleaver.

The number of data units such as e.g data words as described above, which are interleaved in the symbol interleaver and the number of active carriers onto which the interleaved data units are mapped for transmission are in an embodiment of the invention integer multiples of each other. In another embodiment of the invention, the number of the data units, which are interleaved in the symbol interleaver and the number of active carriers onto which the interleaved data units are mapped, are even integer multiples of each other. The number of the data units, the block size, in symbol interleaving may be larger or smaller than the number of active carriers in the mode, which is used for data transmission, and onto which the interleaved data units are mapped.

The symbol interleaver produces an output stream $Y_0, Y_1, \ldots$, wherein $Y_0$ represents the sequence of interleaved 1512 (in 2K mode) or 6048 (in 8K mode) data words belonging to a first 2K or 8K OFDM-symbol. Correspondingly, $Y_1$ represents the interleaved data words of a second OFDM-symbol.

Figure 2:
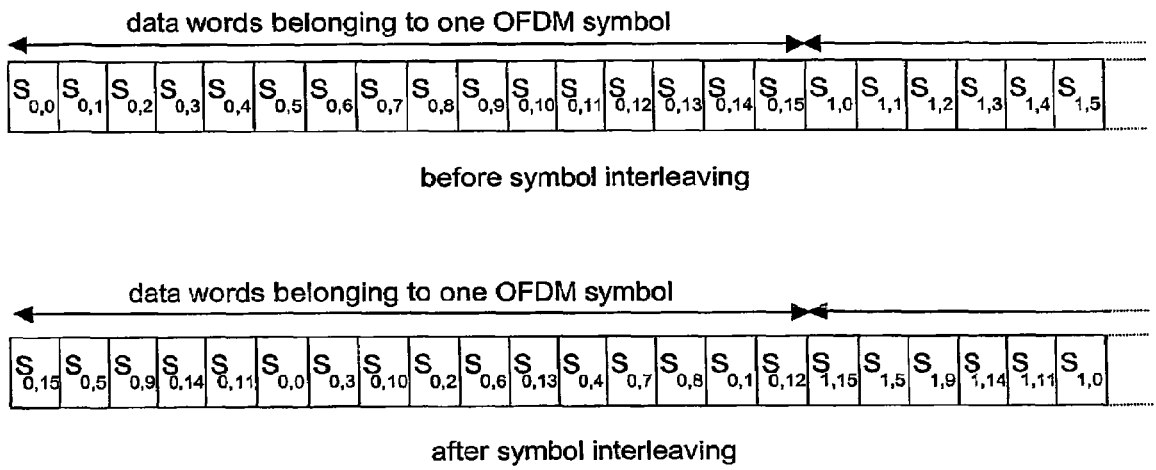
FIG. 2 shows the symbol interleaving principle of the DVB-T standard.

FIG. 2 shows the symbol interleaving principle of the DVB-T standard. It is to be noted that, for reasons of clarity, FIG. 2 only represents a simplified case. FIG. 2 is divided into two parts: The upper part illustrates data words $S_{n,k}$ before symbol interleaving and the lower part illustrates data words $S_{n,k}$ after symbol interleaving. The index n indicates the ordinal number of the OFDM-symbol concerned and index k indicates the sequential order of data words before symbol interleaving. For example, $S_{0,5}$ indicates the sixth (the numbering of indexes starts from 0) data word belonging to the first OFDM-symbol.

As described in the preceding, in a real case, the number of data words that fit into one OFDM-symbol is 1512 (2K mode) or 6048 (8K mode). However, in the simplified case of FIG. 2 the number shown is only 16. This is due to drawing-technical reasons.

The data words $S_{0,0}$-$S_{0,15}$ belonging to the first OFDM-symbol are interleaved with each other. Similarly, the data words $S_{1,0}$-$S_{1,15}$ belonging to the second OFDM-symbol are interleaved with each other and so on. The lower part of FIG. 2 shows an exemplary interleaving result. It can be seen that the interleaving depth of the symbol interleaving according to DVB-T standard is one OFDM-symbol since data words belonging to one OFDM-symbol are only interleaved inside the area of that one OFDM-symbol. Since the block size used is exactly the same as the amount of active carriers that fit into one OFDM-symbol no inter-symbol interleaving is done here between data words belonging to different OFDM-symbols.

According to a preferred embodiment of the invention the interleaving depth is modified. In the following, three preferred embodiments are described. In the first one, 8K symbol interleaving is used together with the proposed 4K mode. In the second one, 2K symbol interleaving is used together with the proposed 4K mode. In the third one, 8K symbol interleaving is used together with 2K mode.

Figure 3:
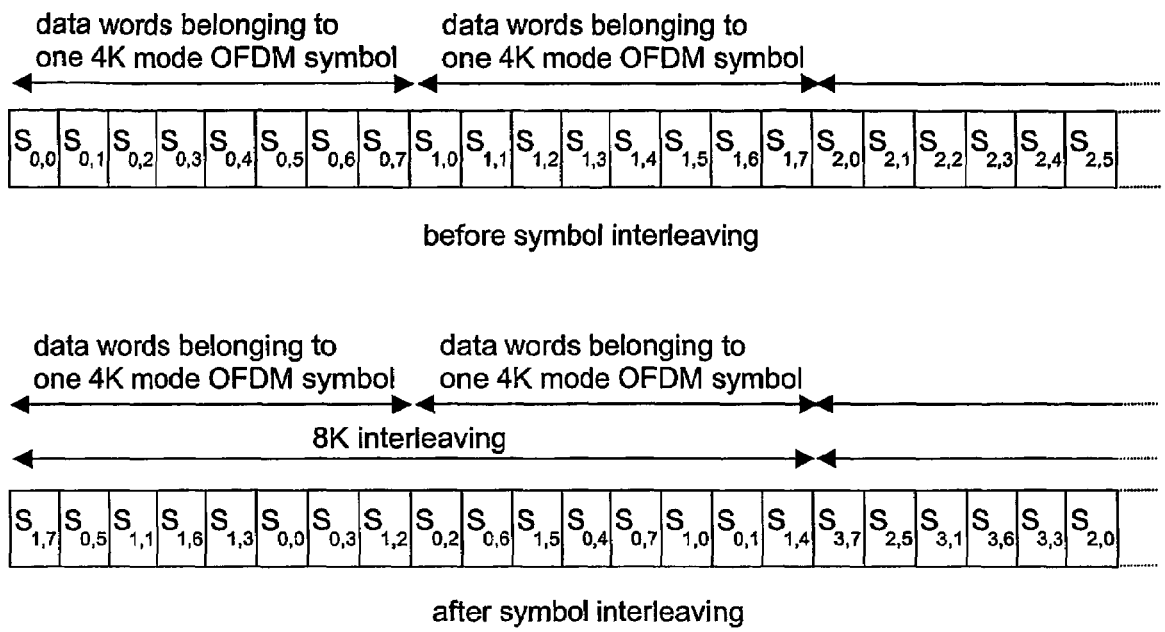
FIG. 3 shows symbol interleaving according to a preferred embodiment of the invention.

FIG. 3 shows symbol interleaving according to the first preferred embodiment of the invention. It is to be noted that again, for reasons of clarity, FIG. 3 only represents a simplified case. FIG. 3 is divided into two parts: The upper part illustrates data words $S_{n,k}$ before symbol interleaving and the lower part illustrates data words $S_{n,k}$ after symbol interleaving. The index n indicates the ordinal number of the OFDM-symbol concerned and index k indicates the sequential order of data words before symbol interleaving (the numbering of indexes starts from 0). It is also to be noted that although the upper part of FIG. 3 (and the following FIGS. 4 and 5) already mentions OFDM-symbols and data words belonging to OFDM-symbols, the OFDM-symbols are actually formed only later in the transmitter. However, for reasons of clarity the term OFDM-symbol has been used already in this context. To be more spesific, the term "data words belonging to one OFDM-symbol" actually means only the amount of data, i.e. the number of data words that ultimately fit into one OFDM-symbol.

FIG. 3 illustrates the use of 8K symbol interleaver in 4K mode. If the 4K mode is implemented analogously to the existing 2K and 8K modes the number of carriers in 4K mode is 3024. Accordingly, the number of data words that fit into one 4K mode OFDM-symbol is also 3024. This is exactly half of the number of data words that fit into one 8K mode OFDM-symbol and twice the number of data words that fit into one 2K mode OFDM-symbol. However, in the simplified case of FIG. 3 the number of data words that fit into one 4K mode OFDM-symbol shown is only 8. This is due to drawing-technical reasons.

Now that 8K symbol interleaver (whose block size 6048 is twice the number of data words that fit into one 4K mode OFDM-symbol) is used in 4K mode, twice the number of data words that fit into one 4K mode OFDM-symbol are interleaved, at a time, according to 8K symbol interleaver rules. In terms of FIG. 3, the first 16 data words $S_{0,0}$-$S_{1,7}$ are interleaved with each other. Of these data words the first eight data words $S_{0,0}$-$S_{1,7}$ belong to the first 4K OFDM-symbol and the next eight data words $S_{1,0}$-$S_{1,7}$ belong to the second 4K OFDM-symbol. Similarly, the data words $S_{2,0}$-$S_{3,7}$ belonging to the third and fourth OFDM-symbols are interleaved with each other and so on.

The lower part of FIG. 3 shows an exemplary interleaving result. It can be seen that the interleaving depth of the symbol interleaving according to the first preferred embodiment is two (4K mode) OFDM-symbols since data words that would fit into one 4K mode OFDM-symbol are interleaved in the area of two (4K mode) OFDM-symbols. Accordingly, when using 8K mode symbol interleaver (whose block size 6048 is twice the number of data words that fit into one 4K mode OFDM-symbol) in 4K mode, inter-symbol interleaving is done between data words belonging to two adjacent 4K mode OFDM-symbols.

The fact that the symbol interleaving covers more than one OFDM-symbol improves the system's capability to cope with impulse like interference and sudden changes (dynamics) on channels. Also, the use of the existing 8K mode symbol interleaver in 4K mode dispenses with the need to define a new symbol interleaver for 4K mode. This will save space both in the DVB-T transmitter and especially in a plurality of DVB-T receivers since no new circuitry is needed for an extra interleaver (or de-interleaver).

Figure 4:
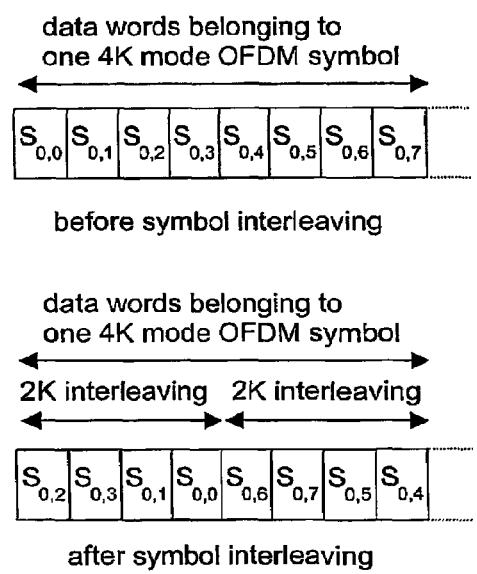
FIG. 4 shows symbol interleaving according to another preferred embodiment of the invention.

FIG. 4 shows symbol interleaving according to the second preferred embodiment of the invention. It is to be noted that again, for reasons of clarity, FIG. 4 only represents a simplified case. FIG. 4 is divided into two parts: The upper part illustrates data words $S_{n,k}$ before symbol interleaving and the lower part illustrates data words $S_{n,k}$ after symbol interleaving. The index n indicates the ordinal number of the OFDM-symbol concerned and index k indicates the sequential order of data words before symbol interleaving (the numbering of indexes starts from 0).

FIG. 4 illustrates the use of 2K mode symbol interleaver in 4K mode. As described in the foregoing, the number of data words that fit into one 4K mode OFDM-symbol is 3024. However, in the simplified case of FIG. 4 the number of data words that fit into one 4K mode OFDM-symbol is only 8. This is due to drawing-technical reasons.

Now that 2K mode symbol interleaver (whose block size 1512 is half of the number of data words that fit into one 4K mode OFDM-symbol) is used in 4K mode, half of the number of data words that fit into one 4K mode OFDM-symbol are interleaved, at a time, according to 2K symbol interleaver rules. In terms of FIG. 4, the first 4 data words $S_{0,0}$-$S_{0,3}$ are interleaved with each other. Similarly, the next 4 data words $S_{0,4}$-$S_{0,7}$ are interleaved with each other and so on.

The lower part of FIG. 4 shows an exemplary interleaving result. It can be seen that the interleaving depth of the symbol interleaving according to the second preferred embodiment is a half (4K mode) OFDM-symbol since the first half and the second half of data words belonging to one 4K mode OFDM-symbol are interleaved independently.

The use of 2K mode symbol interleaver in 4K mode compared to the use of 8K mode symbol interleaver in 4K mode has an advantage relating to symbol de-interleaving at the DVB-T receiver. While the symbol de-interleaving at the DVB-T receiver, in connection with the use of 8K mode symbol interleaver in 4K mode, can be started only in the beginning of every second received 4K OFDM-symbol (due to the fact that the block size of 8K mode symbol interleaver is twice the number of data words that fit into one 4K mode OFDM-symbol), the symbol de-interleaving, in connection with the use of 2K mode symbol interleaver in 4K mode, can be started in the beginning of every received 4K OFDM-symbol. In this way, the use of 2K mode symbol interleaving in 4K mode provides a shorter delay.

Figure 5:
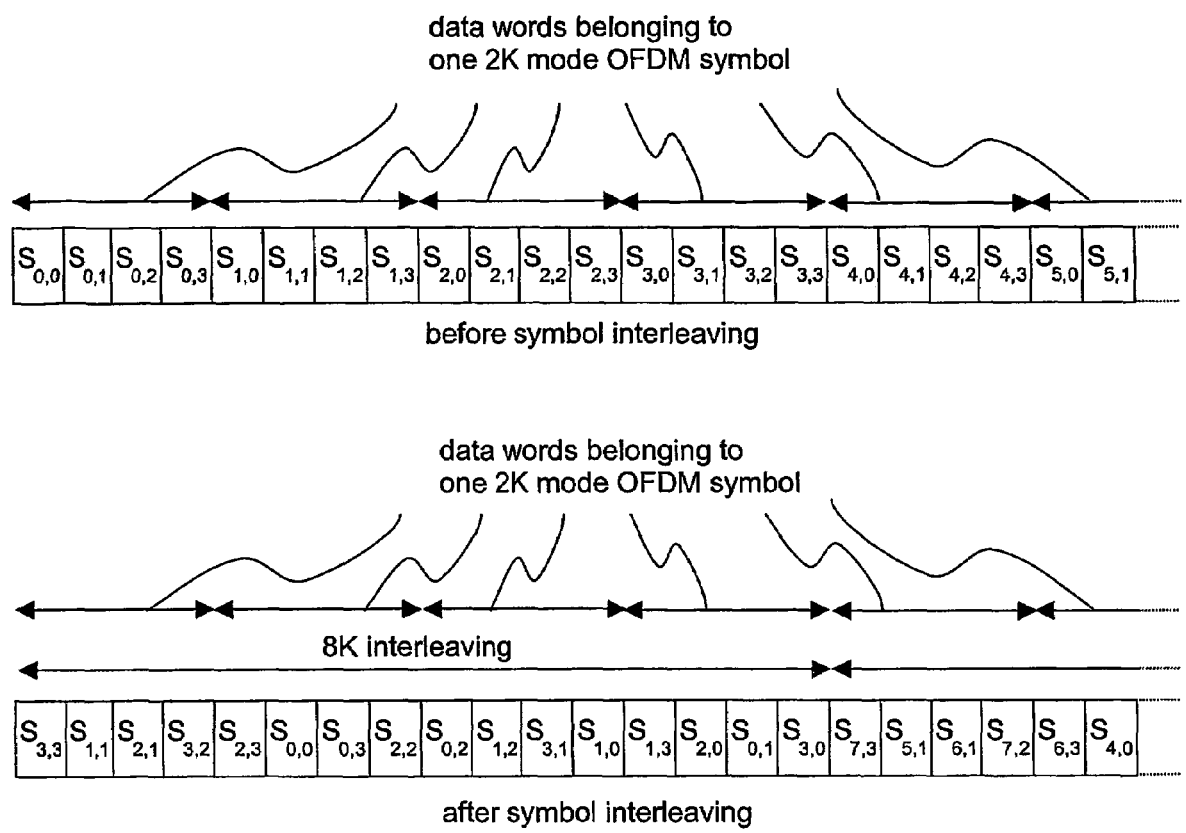
FIG. 5 shows symbol interleaving according to yet another preferred embodiment of the invention.

FIG. 5 shows symbol interleaving according to the third preferred embodiment of the invention. It is to be noted that again, for reasons of clarity, FIG. 5 only represents a simplified case. FIG. 5 is divided into two parts: The upper part illustrates data words $S_{n,k}$ before symbol interleaving and the lower part illustrates data words $S_{n,k}$ after symbol interleaving. The index n indicates the ordinal number of the OFDM-symbol concerned and index k indicates the sequential order of data words before symbol interleaving (the numbering of indexes starts from 0).

FIG. 5 illustrates an embodiment of the use of 8K symbol interleaver in 2K mode. As described in the foregoing, the number of data words that fit into one 2K mode OFDM-symbol is 1512. However, in the simplified case of FIG. 5 the number of data words that fit into one 2K mode OFDM-symbol shown is only 4. This is due to drawing-technical reasons.

Now that 8K symbol interleaver (whose block size 6048 is four times the number of data words that fit into one 2K mode OFDM-symbol) is used in 2K mode, four times the number of data words that fit into one 2K mode OFDM-symbol are interleaved, at a time, according to 8K symbol interleaver rules. In terms of FIG. 5, the first 16 data words $S_{0,0}$-$S_{3,3}$ are interleaved with each other. Of these data words the first four data words $S_{0,0}$-$S_{0,3}$ belong to the first 2K mode OFDM-symbol, the next four data words $S_{1,0}$-$S_{1,3}$ belong to the second 2K mode OFDM-symbol, the next four data words $S_{2,0}$-$S_{2,3}$ belong to the third 2K mode OFDM-symbol and so on. Similarly, the data words $S_{4,0}$-$S_{7,3}$ belonging to the fifth, sixth, seventh and eight OFDM-symbols are interleaved with each other and so on.

The lower part of FIG. 5 shows an exemplary interleaving result. It can be seen that the interleaving depth of the symbol interleaving according to the third preferred embodiment is four 4K mode OFDM-symbols since data words belonging to one 2K mode OFDM-symbol are interleaved in the area of four 2K mode OFDM-symbols. Accordingly, when using 8K mode symbol interleaver in 2K mode, inter-symbol interleaving is done between data words belonging to four adjacent 2K mode OFDM-symbols.

As described in connection with the first preferred embodiment, the fact that the symbol interleaving covers more than one OFDM-symbol improves the system's capability to cope with impulse like interference and sudden changes (e.g. fading) on channels. The use of the 8K mode symbol interleaver in 2K mode thus helps with the basically weak impulse noise tolerance of the 2K mode. This kind of use can be useful in mobile systems where, hence, the high mobility of the 2K mode can now be combined with the better tolerance against impulsive noise of the 8K mode.

Figure 6:
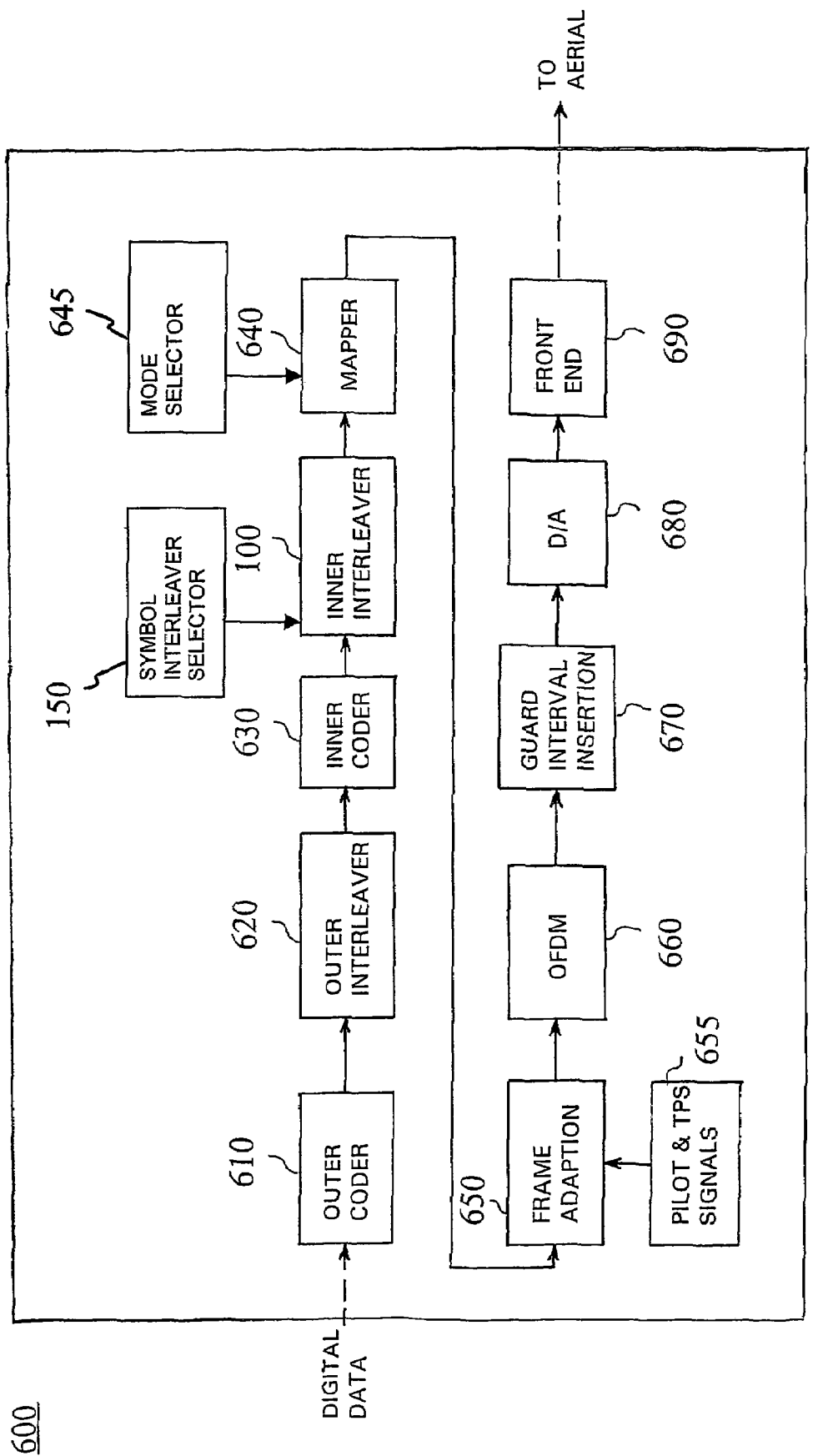
FIG. 6 shows blocks of a DVB-T transmitter suitable for implementing an embodiment of the invention.

FIG. 6 shows blocks of a DVB-T transmitter 600 suitable for implementing the invention. The DVB-T transmitter is known as such to a person skilled in the art. The person skilled in the art will also know that the DVB-T transmitter may comprise blocks other than those shown in FIG. 6.

The DVB-T transmitter 600 comprises an outer coder 610 which Reed-Solomon encodes the digital data to be transmitted. An outer interleaver 620 performs convolutional interleaving on the digital data. An inner coder 630 codes the digital data with the aid of punctured convolutional code. The operation of the inner interleaver 100, in relation to the present invention, has been described in the fore-going. The inner interleaver 100 corresponds to the inner interleaver of FIG. 1 and comprises a demultiplexer 110, a plurality of bit interleavers and a set of symbol interleavers 130. A symbol interleaver selector means 150 is provided for selecting one from the set of symbol interleavers. This symbol interleaver selector means 150 is connected to the inner interleaver. A mapper 640 modulates the carriers according to a chosen QAM constellation. In an embodiment of the invention the mode, which relates to the number of active carriers, is chosen by using a mode selector means 645. A frame adaptation block 650 organizes the transmitted signal into frames and adds to the frames pilot signals (scattered and continual) as well as TPS (Transmission Parameter Signalling) carriers which it receives from block 655. An OFDM modulator 660 performs, among other things, an inverse Fast Fourier Transform (IFFT) in order to convert the transmitted signal from frequency to time domain. A guard interval insertion block 670 inserts a guard interval in the beginning of each OFDM-symbol. A digital-to-analog converter 680 converts the transmitted signal from digital to analog domain. A front end 690 takes care of the transmission of the DVB-T signal via an antenna (aerial).

The DVB-T transmitter 600 is operable in more than one mode of operation (i.e. 2K mode, 4K mode or 8K mode) corresponding to the number of active carriers (i.e. 1512, 3024 or 6048 active carriers). The DVB-T transmitter 600 comprises means 645 for selecting the mode of operation among the available modes (the number of available modes may be one or more) and means 150 for selecting one of the available symbol interleavers 130 (i.e. 2K, 4K or 8K symbol interleaver, for example). The transmitter 600 may also comprise means for incorporating the indication of the selected symbol interleaver into the transmitted signal of the transmitter 600. The selection of the symbol interleaver 130 among the available symbol interleavers in the inner interleaver 100 can be done so that the selected symbol interleaver is different from the symbol interleaver associated to the selected mode of operation. In this embodiment the mode of operation, which is understood to relate to the number of active carriers, and the block size determining the number of data words to be interleaved at a time may thus be different from each other.

It is to be noted that independently of the used symbol interleaver in whichever of the modes, the rest of the DVB-T transmitter operates as the mode in question requires. Therefore, for example when 8K mode symbol interleaver is used in 4K mode the inverse Fast Fourier Transform is still performed, at a time, on the number of data words that it is normally performed in 4K mode. It is also to be noted that the used symbol interleaver has no effect on bit-wise interleaving, i.e. bit-wise interleaving is performed in the same way independent of the used symbol interleaver.

The digital data that the DVB-T transmitter transmits may be, inter alia, an MPEG-2 decoded broadband digital television signal, an audio signal, a signal of a datacasting system, such as IP-datacasting system, or their combination.

Figure 7:
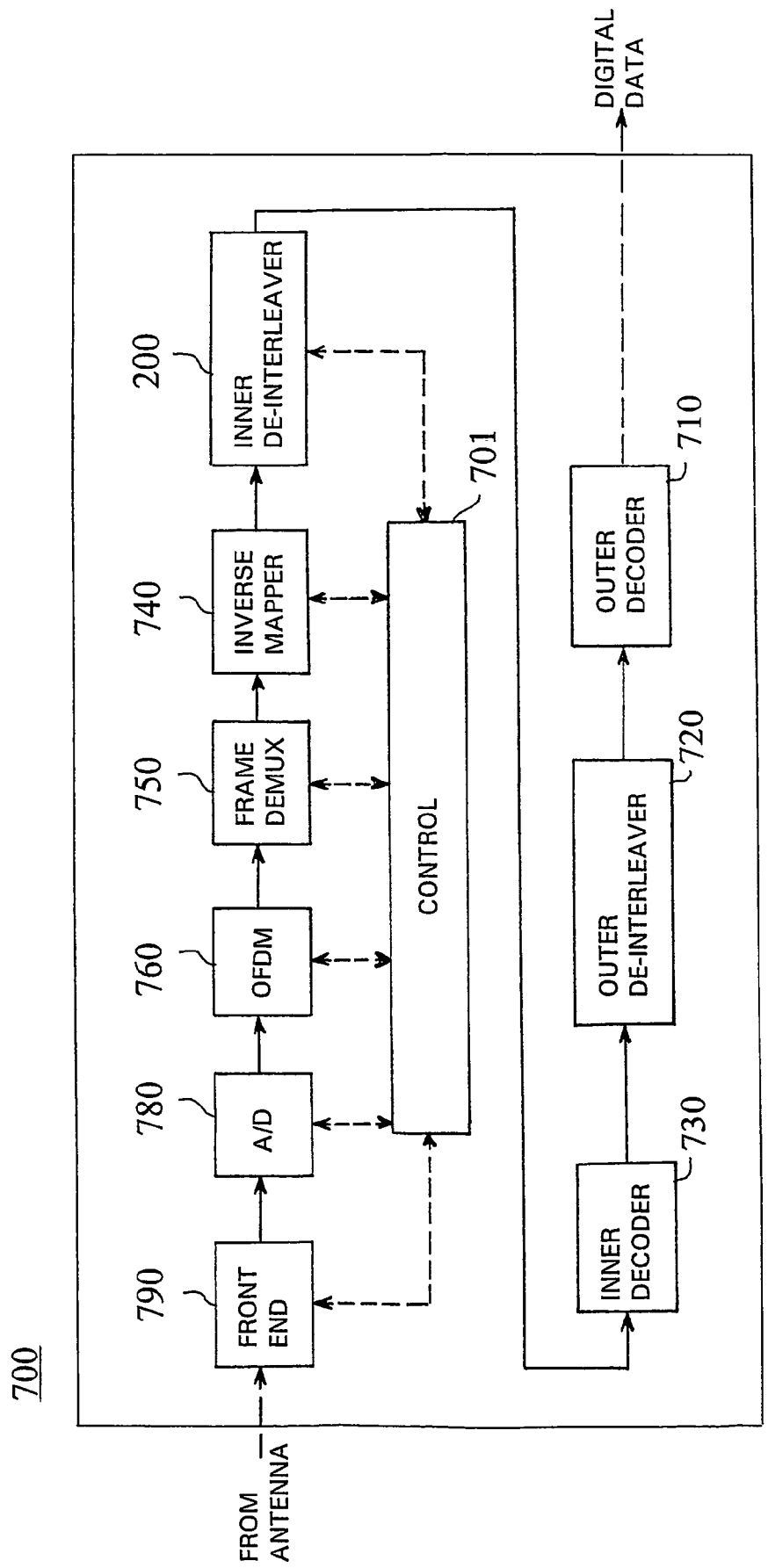
FIG. 7 shows blocks of a DVB-T receiver suitable for implementing an embodiment of the invention.

FIG. 7 shows an embodiment of blocks of a DVB-T receiver 700 suitable for implementing the invention. The DVB-T receiver is known as such to a person skilled in the art. The person skilled in the art will also know that the DVB-T receiver 700 may comprise blocks other than those shown in FIG. 7.

The DVB-T receiver 700 comprises a front end 710 which receives the transmitted DVB-T signal via an antenna. An analog-to-digital converter 780 converts the received signal from analog to digital domain. An OFDM demodulator 760 performs, among other things, a Fast Fourier Transform (FFT) in order to convert the received signal from time to frequency domain. A frame demultiplexer 750 demultiplexes the received OFDM frames. An inverse mapper 740 performs an operation inverse to the mapper 640 of the DVB-T transmitter 600. An inner de-interleaver 200 performs an operation inverse to the inner interleaver 100. Accordingly, the inner de-interleaver 200 comprises a set of symbol de-interleavers followed by bit de-interleavers. A control block 701 is coupled to the front end 790, analog-to-digital converter 780, OFDM demodulator 760, frame demultiplexer 750, inverse mapper 740 and inner de-interleaver 200 for time and frequency synchronization, common phase error correction, channel estimation and reliability estimation. In one embodiment of the invention, the control block 701 receives information from the other blocks 790, 780, 760, 750, 740 and 200 connected to it, and creates control signals based on the received information for controlling the data processing in said other blocks. These operations comprise the recognition of the interleaver used in the transmitted signal and selection of the corresponding de-interleaver. In this embodiment, the control block 701 thus acts as means for recognizing the used interleaver in the transmitter and means for selecting one of the available symbol de-interleavers for symbol de-interleaving, wherein the selection is based on said indication of the selected symbol interleaver in the transmitting end which indication the DVB-T transmitter 600 has incorporated into the signal that the DVB-T receiver receives. An inner decoder 730, outer de-interleaver 720 and outer decoder 710 perform operation inverse to the corresponding blocks 630, 620 and 610 of the transmitter 600. Before the transmitted digital data in its original form is obtained the received signal is typically further processed in blocks not shown in FIG. 7. These blocks may involve descrambling, video, audio and/or data encoding.

The receiver may e.g. be a fixed DVB-T receiver mounted in a set-top-box or a mobile DVB-T receiver integrated in to a mobile handheld device, such as e.g. a handheld mobile phone. In addition to broadband reception, the receiver may, inter alia, have a return channel via a cellular radio network, such as GSM, GPRS, WLAN, UMTS or All WP network. Alternatively, or in addition, it may have a fixed return channel with the aid of DECT technology or fixed telephone line.

Figure 9:
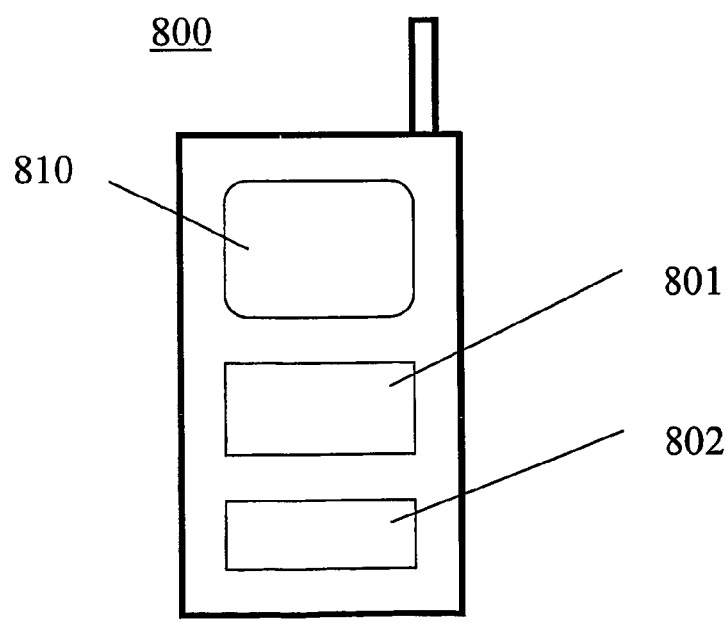
FIG. 9 shows a mobile receiver suitable for implementing an embodiment of the invention.

In one embodiment of the invention as illustrated in FIG. 9 the handheld mobile phone 800 has a DVB-T receiver 802 for OFDM reception and a second transceiver 801 for conventional mobile communication. The handheld mobile phone may also comprise a display 810. The DVB-T receiver in the handheld mobile phone comprises means for recognizing the interleaver used in the transmission of the OFDM signal, a set of de-interleavers, and means for selecting the de-interleaver based on the recognized interleaver.

As described in the foregoing, in connection with the embodiments of the invention, a different inner interleaver (especially symbol interleaver) than the one originally designed for the operational mode (2K, 4K or 8K) can be used. An embodiment of the invention provides selecting one operational mode from a plurality of available modes and selecting one symbol interleaver (or inner interleaver containing the symbol interleaver) from a plurality of available symbol interleavers for use in the selected mode. In other words, this embodiment provides symbol interleavers to be used with any of the operational modes thus providing different depths of interleaving. The following table shows the alternatives. If any other mode, such as 1K or 16K mode will be defined, the table can be expanded.

| Operational mode | Symbol Interleaver | Interleaving depth |
|---|---|---|
| 8K | 8K | one OFDM-symbol |
| 8K | 4K | symbol is interleaved twice |
| 8K | 2K | symbol is interleaved four times |
| 4K | 8K | two OFDM-symbols |
| 4K | 4K | one OFDM-symbol |
| 4K | 2K | symbol is interleaved twice |
| 2K | 8K | four OFDM-symbols |
| 2K | 4K | two OFDM-symbols |
| 2K | 2K | one OFDM-symbol |

In the DVB-T receiver, symbol and bit-wise de-interleaving is performed in the inner de-interleaver 200 (FIG. 7).

If a symbol interleaver other than the one specifically designed for a particular mode is used, the information of the used interleaver can be transferred from the transmitter to the receiver so that the receiver can de-interleave the transmitted OFDM-symbols correctly.

One possibility is to indicate the used symbol interleaver using one or more TPS bits. In this alternative, the selection of the symbol interleaver is coded with one or more bits, which bits form part of the TPS bits. In the transmitter (FIG. 6), the blocks 650 and 655 set these bits according to the used symbol interleaver. In the receiver (FIG. 7) the control block 701 and the inner de-interleaver interpret the received bits accordingly.

Another possibility is to indicate the used symbol interleaver in an application layer (or at least in a protocol layer higher in a protocol stack than the physical layer).

In a system in which the used interleaving mode (symbol interleaver) is not signalled at all, the receiver can, according to one embodiment of the invention, detect the used interleaving mode by trying a de-interleaving mode (e.g. 8K mode de-interleaving) and measure the bit error rate. If the obtained bit error rate is too high the receiver tries another de-interleaving mode until the right mode is found. Further the receiver has to get position information of interleaved symbols. However, since the well known TPS synchronization is in any case performed at the beginning of a connection, this will also give synchronization to the inner de-interleaver.

It is to be noted that although only the use of 2K, 4K and 8K mode symbol interleavers has been described, the application is not restricted to these modes only. The invention may be used also in the context of other possible modes of operation such as 1K mode, 0.5K mode or 16K mode, for example.

Particular implementations and embodiments of the invention have been described. Although, in this description, the DVB-T system has been used as an example of an OFDM based system, the invention can also be applied in another OFDM based system, such as the Japanese ISDB-T (Integrated Services Digital Broadcasting-Terrestrial) system. It is also to be noted that in one embodiment of the invention a transmitter may be used which has only one mode of operation but more than one symbol interleavers. A suitable symbol interleaver may be selected for that mode depending on the desired interleaving depth.

It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method, comprising:
    communicating digital data using an orthogonal frequency division multiplexing transmission system;
    selecting a mode of operation in a transmitter among at least two modes, each mode of operation being associated with a number of active carriers for payload data transmission;
    selecting a symbol interleaver in the transmitter from a plurality of symbol interleavers available for symbol interleaving in said selected mode of operation, wherein the selection of the symbol interleaver is based on a desired depth of interleaving;
    applying the selected symbol interleaver in the transmitter on blocks of data units;
    mapping the interleaved data units onto the active carriers of said selected mode of operation; and
    wherein a number of data units in the blocks onto which the symbol interleaving is applied differs from the number of the active carriers in said selected mode.

2. A method according to claim 1, wherein the number of data units in the block and the number of active carriers in said selected mode are integer multiples of each other.

3. A method according to claim 2, wherein the number of data units in the block and the number of active carriers in said selected mode are even integer multiples of each other.

4. A method according to claim 1, wherein the number of data units in the block is larger than the number of active carriers.

5. A method according to claim 4, wherein the number of data units in the block is two or a multiple of two times the number of active carriers.

6. A method according to claim 1, wherein the number of data units in the block is smaller than the number of active carriers.

7. A method according to claim 6, wherein the number of active carriers is two or a multiple of two times the number of data units in the block.

8. A method according to claim 1, wherein the data units form part of one of the following: a broadband digital television transmission, a datacasting transmission.

9. A method according to claim 1, wherein the plurality of symbol interleavers comprises at least an 8K mode symbol interleaver and a 2K mode symbol interleaver and at least a 4K mode of operation is selectable for a DVB-T (Digital Video Broadcasting-Terrestrial) system.

10. A method according to claim 1, wherein the plurality of symbol interleavers comprises at least an 8K mode symbol interleaver and at least a 2K mode of operation is selectable for a DVB-T system.

11. A method according to claim 1, wherein the data units are data units of one or more OFDM-symbols.

12. A method according to claim 1, wherein the digital data communication system is one of the following: a DVB-T (Digital Video Broadcasting-Terrestrial) system, an ISDB-T (Integrated Services Digital Broadcasting-Terrestrial) system.

13. The method according to claim 1, wherein one mode of operation is distinguishable from another mode of operation by said number of active carriers.

14. An apparatus, comprising:
    a transmitter for communicating digital data using orthogonal frequency division multiplexing transmission, the apparatus having a plurality of modes of operation, each mode being associated with a predetermined number of active carriers used for transmitting payload data from the transmitter to a receiver;
    a plurality of symbol interleavers in the transmitter, for symbol interleaving, a mode selector in the transmitter, for selecting a mode of operation for data transmission;
    a symbol interleaver selector in the transmitter, for selecting a symbol interleaver from the plurality of symbol interleavers available for symbol interleaving in said selected mode of operation, wherein the symbol interleaver selector is adapted to make the selection based on a desired depth of interleaving;
    whereby said selected symbol interleaver is applied in the transmitter on blocks of data units; and
    wherein a number of data units in the blocks onto which the symbol interleaving is applied differs from the number of the active carriers in said selected mode.

15. A transmitter according to claim 14, wherein said plurality of symbol interleavers form part of an inner interleaver of the transmitter.

16. A transmitter according to claim 14, wherein the transmitter is arranged to transmit information indicative of said selected symbol interleaver to an OFDM receiver.

17. A transmitter according to claim 16, wherein one or more TPS (Transmission Parameter Signalling) bits are arranged to convey said information indicative of said selected symbol interleaver.

18. The apparatus according to claim 14, wherein one mode of operation is distinguishable from another mode of operation by said number of active carriers.

19. An apparatus, comprising:
a receiver for communicating digital data using orthogonal frequency division multiplexing communication, the apparatus having a plurality of modes of operation, each mode being associated with a predetermined number of active carriers used for transmitting data units from a transmitter to the receiver, the transmitter further having a plurality of symbol interleavers to be used for symbol interleaving;
a control block in the receiver, configured for recognizing a symbol interleaver of the plurality used in the data transmission, based on information received about the used symbol interleaver, the symbol interleaver having been selected based on a desired depth of interleaving, wherein said selected symbol interleaver is applied in the transmitter on blocks of data units and a number of data units in the blocks onto which the symbol interleaving is applied differs from the number of the active carriers in said selected mode;
a plurality of symbol de-interleavers in the receiver for de-interleaving received data units which have been interleaved at the transmitter in the symbol interleaver; and
said control block further configured for selecting a symbol de-interleaver from the plurality of symbol de-interleavers corresponding to the recognized symbol interleaver.

20. A receiver according to claim 19, wherein the receiver is arranged to receive information indicative of the used symbol interleaver.

21. A receiver according to claim 19, wherein an output from the control block configured for recognizing the symbol interleaver used in the data transmission, is an information indicative of the recognized symbol interleaver.

22. A receiver according to claim 19, wherein the receiver is one of the following: a fixed receiver, a mobile receiver.

23. A receiver according to claim 19, wherein the receiver comprises means for a return channel via a cellular radio network and/or via a fixed network.

24. The apparatus according to claim 19, wherein one mode of operation is distinguishable from another mode of operation by said number of active carriers.

25. A system, comprising:
a digital data communicating system using an orthogonal frequency division multiplexing transmitting system comprising at least one transmitter and at least one receivers, the system having a plurality of modes of operation, each mode being associated with a predetermined number of active carriers used for transmitting payload data from a transmitter to at least one receiver, the transmitter having a plurality of symbol interleavers to be used for symbol interleaving on blocks of data units at the transmitter, the at least one receiver having a plurality of symbol de-interleavers for de-interleaving the interleaved data units at the receiver;
a mode selector in the transmitter for selecting a mode of operation to be used in data transmission;
a symbol interleaver selector in the transmitter for selecting a symbol interleaver for symbol interleaving in a selected mode of operation, wherein the symbol interleaver selector is adapted to make the selection based on a desired depth of interleaving;
wherein said selected symbol interleaver is applied in the transmitter on blocks of data units and a number of data units in the blocks onto which the symbol interleaving is applied differs from the number of the active carriers in said selected mode;
an inner interleaver in the transmitter for applying symbol interleaving on blocks of data units;
a control block in said at least one receiver configured for recognizing the symbol interleaver used in the data transmission; and
the control block in said at least one receiver further configured for selecting a symbol de-interleaver from a plurality of symbol de-interleavers corresponding to the recognized symbol interleaver.

26. A system according to claim 25, wherein the ratio between the number of the active carriers in the different modes of operation is an integer number.

27. A system according to claim 25, wherein the ratio between the number of the active carriers in the different modes of operation is two or a multiple of two.

28. A system according to claim 25, wherein the number of symbol interleavers in the plurality of symbol interleavers is smaller than the number of the modes of operation of the system.

29. The system according to claim 25, wherein one mode of operation is distinguishable from another mode of operation by said number of active carriers.

30. A method, comprising:
communicating digital data using an orthogonal frequency division multiplexing transmission system including at least one transmitter and at least one receiver, the system further having a plurality of modes of operation, each mode being associated with a predetermined number of active carriers used for transmitting data units from said at least one transmitter to the at least one receiver;
receiving, in the at least one receiver, interleaved data units and information of a symbol interleaver used for symbol interleaving at said at least one transmitter;
recognizing in the at least one receiver, based on said received information of the used symbol interleaver, a symbol interleaver used in the data transmission, the symbol interleaver having been selected based on a desired depth of interleaving;
wherein said selected symbol interleaver is applied in the transmitter on blocks of data units and a number of data units in the blocks onto which the symbol interleaving is applied differs from the number of the active carriers in a select mode of the plurality of modes of operation;
selecting a de-interleaver in the at least one receiver to correspond to the recognized symbol interleaver; and
de-interleaving in the at least one receiver the received data units using the selected de-interleaver.

* * * * *